United States Patent
Ishihara et al.

(10) Patent No.: US 7,221,963 B2
(45) Date of Patent: May 22, 2007

(54) ANTENNA SELECTION DIVERSITY APPARATUS AND RECEPTION METHOD

(75) Inventors: Yoshiharu Ishihara, Hamamatsu (JP); Yasushi Iwata, Hamamatsu (JP); Toshio Obara, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/544,388

(22) PCT Filed: Nov. 4, 2004

(86) PCT No.: PCT/JP2004/016338

§ 371 (c)(1), (2), (4) Date: Aug. 3, 2005

(87) PCT Pub. No.: WO2005/046082

PCT Pub. Date: May 19, 2005

(65) Prior Publication Data
US 2006/0234776 A1    Oct. 19, 2006

(30) Foreign Application Priority Data
Nov. 6, 2003  (JP) .............................. 2003-377499

(51) Int. Cl.
H04B 1/38  (2006.01)
H04M 1/00  (2006.01)
(52) U.S. Cl. ............................. 455/562.1; 455/277.1; 455/277.2; 370/332; 375/299
(58) Field of Classification Search ............... 455/13.3, 455/277.1, 277.2, 562.1; 340/2.1, 2.23, 7.1, 340/7.34; 370/332, 334, 347; 375/267, 375/347, 299
See application file for complete search history.

(56) References Cited
U.S. PATENT DOCUMENTS
5,239,541 A * 8/1993 Murai ....................... 370/77
(Continued)

FOREIGN PATENT DOCUMENTS
JP      01189248    7/1989
(Continued)

OTHER PUBLICATIONS
PCT International Search Report dated Feb. 15, 2005.

*Primary Examiner*—Quochien B. Vuong
*Assistant Examiner*—Tuan H. Nguyen
(74) *Attorney, Agent, or Firm*—Stevens, Davis, Miller & Mosher, LLP

(57) ABSTRACT

An antenna selection diversity apparatus capable of shortening, when antennas are switched in frame units, a measuring time of antennas and shortening the time of selecting an optimal antenna from among a plurality of antennas on standby. In this apparatus, an antenna selection section (109) selects one of three antennas as an antenna in actual use for a period of a plurality of frames consecutively according to selection priority stored in an antenna information storage section (108) and gives an instruction for selecting one of two antennas on standby as an antenna to be measured once at a period of a plurality of frames to an antenna selection switch (104). When the reception level of the antenna in actual use measured by a reception level measuring section (107) falls below the reception level of the antenna to be measured a predetermined number of times consecutively, the antenna selection section (109) gives an instruction for selecting the antenna to be measured as the antenna in actual use to the antenna selection switch (104).

10 Claims, 10 Drawing Sheets

U.S. PATENT DOCUMENTS 6,721,550 B1 *  4/2004  Okada et al. ............ 455/277.1
2005/0208897 A1 *  9/2005  Lyons et al. ............. 455/67.11

FOREIGN PATENT DOCUMENTS

JP          06140971         5/1994

* cited by examiner ns/reception
ANTENNA SELECTION DIVERSITY APPARATUS AND RECEPTION METHOD

TECHNICAL FIELD

The present invention relates to an antenna selection diversity apparatus and reception method used for a mobile station such as a cellular phone and a base station which carries out radio communication with this mobile station in a mobile communication system.

BACKGROUND ART

A mobile communication is often subject to fading which causes the level of a received signal to fluctuate depending on various radio wave propagation environments. An effective measure against this fading is antenna selection diversity. The antenna selection diversity is implemented normally by installing a plurality of antennas and carrying out communication by selecting an antenna with good conditions when a reception condition deteriorates due to fading. As such an antenna selection diversity apparatus, for example, those disclosed in Patent Documents 1 and 2 are conventionally known.

Patent Documents 1 and 2 disclose antenna selection diversity apparatuses based on a TDMA (Time Division Multiple Access) communication scheme time-sharing a common frequency by a plurality of users, which realizes diversity by sampling intensity of received signals through antennas during a time slot period irrelevant to a receiver and selecting an optimal antenna before receiving a time slot relevant to the receiver. An overview of such an antenna selection diversity apparatus will be explained below.

FIG. 1 is a block diagram showing a configuration example of a conventional antenna selection diversity apparatus. FIG. 1 shows an antenna selection diversity apparatus in a minimum configuration with two antennas. That is, the conventional antenna selection diversity apparatus 10 shown in FIG. 1 is provided with antennas 11, 12, a switch 13, an antenna duplexer 14, a reception section 15, a reception level measuring section 16, a timing control section 17, an antenna selection section 18 and a transmission section 19.

In such a configuration, the timing control section 17 controls timings for transmitting/receiving data, measuring antenna reception levels and selecting an antenna to realize antenna selection diversity, gives an antenna selection instruction to the antenna selection section 18 and a measurement instruction to the reception level measuring section 16.

The antenna selection section 18 causes the switch 13 to perform switching operation at the timing instructed from the timing control section 17. That is, the switch 13 selects the antenna 11 during a certain antenna reception level measuring time, connects the antenna to the reception section 15 through the antenna duplexer 14 or selects the antenna 12 during another antenna reception level measuring time and connects the antenna to the reception section 15 through the antenna duplexer 14.

As a result, the received signal at the antenna 11 and the received signal at the antenna 12 are input to the reception level measuring section 16 through the reception section 15. The reception level measuring section 16 measures the reception level at the antenna 11 and the reception level at the antenna 12 and sends both measured antenna reception levels to the antenna selection section 18.

The antenna selection section 18 compares the reception level of the antenna 11 and the reception level of the antenna 12 sent from the reception level measuring section 16, determines the antenna having the greater reception level as the antenna to be used during a data transmission/reception time and causes the switch 13 to select the antenna. The reception section 15 and transmission section 19 use the antenna selected by the antenna selection section 18 during a data transmission/reception time. Using this antenna selection diversity apparatus 10 makes it possible to carry out communication using an antenna suitable for a radio wave propagation environment, and is therefore expected to improve the communication performance.

[Patent Document 1] Japanese Patent Publication No. 2719575

[Patent Document 2] Unexamined Japanese Patent Publication No. 6-140971

DISCLOSURE OF INVENTION

Problems to be Solved by the Invention

However, since the conventional antenna selection diversity apparatus is constructed so as to be applied to TDMA with time slot periods irrelevant to a receiver during communication, it is not possible to provide a normal measuring time to measure the antenna reception level during communication based on a communication scheme other than TDMA with no time slot periods irrelevant to the receiver during communication. Even if antenna selection diversity is realized before communication, diversity before communication alone cannot respond to fluctuations in a radio wave propagation environment during communication.

For this reason, even when a non-TDMA communication scheme is used, it is necessary to switch between antennas in order to measure antenna reception levels during communication. In this case, antennas are switched in frame units, but the measuring time needs to be set as short as possible. Moreover, the time for selecting an optimal antenna from among a plurality of antennas on standby needs to be shortened. The question is how to meet these demands.

It is an object of the present invention to provide an antenna selection diversity apparatus and reception method capable of, when switching between antennas in frame units, shortening the time for measuring antennas and shortening the time for selecting an optimal antenna from among a plurality of antennas on standby.

Means for Solving the Problem

An antenna selection diversity apparatus of the present invention comprises three or more antennas, an antenna information storage section that stores antenna gains of the three or more antennas as information indicating selection priority, a reception level measuring section that measures the reception level of an antenna in actual use selected within a period of a plurality of frames consecutively and the reception level of an antenna to be measured selected once at the period of a plurality of frames, an antenna selection section that selects one of the three or more antennas as the antenna in actual use within a period of a plurality of frames consecutively according to the selection priority and selects one of a plurality of antennas on standby except the antenna in actual use as the antenna to be measured once at the period of a plurality of frames, the antenna selection section selecting the antenna to be measured as the antenna in actual use when the reception level of the antenna in actual use measured by the reception level measuring section falls below the reception level of the antenna to be measured a predetermined number of times consecutively, selecting the next antenna to be measured according to the selection priority and changing the antenna to be measured according to the selection priority when the above described case does not occur the predetermined number of times consecutively.

An antenna selection diversity apparatus of the present invention comprises three or more antennas, an antenna information storage section that stores antenna gains of the three or more antennas as information indicating selection priority, a reception level measuring section that measures the reception level of an antenna in actual use selected within a period of a plurality of frames consecutively and the reception level of an antenna to be measured selected once at the period of a plurality of frames, a level averaging section that averages the reception level of the antenna in actual use measured by the reception level measuring section and the reception level of the antenna to be measured corresponding to a predetermined number of times respectively, an antenna selection section that selects one of the three or more antennas as the antenna in actual use within a period of a plurality of frames consecutively according to the selection priority and selects one of a plurality of antennas on standby except the antenna in actual use as the antenna to be measured once at the period of a plurality of frames, the antenna selection section selecting the antenna to be measured as the antenna in actual use when a mean value of the reception level of the antenna in actual use calculated by the level averaging section is smaller than a mean value of the reception level of the antenna to be measured and selecting the next antenna to be measured according to the selection priority.

An antenna selection diversity apparatus of the present invention comprises three or more antennas, an antenna information storage section that stores antenna gains of the three or more antennas as information indicating selection priority, a reception level measuring section that measures the reception level of an antenna to be measured selected once at a period of a plurality of frames, a level averaging section that averages the reception level of the antenna to be measured by the reception level measuring section corresponding to a predetermined number of times, an antenna-in-actual-use reception level calculation section that calculates the reception level of the antenna to be measured and the antenna in actual use at an AGC voltage value using a convergence AGC voltage and a reception level vs. AGC voltage characteristic provided beforehand during reception processing on the received signal of the antenna in actual use selected within a period of a plurality of frames consecutively, an antenna selection section that selects one of the three or more antennas as the antenna in actual use within a period of a plurality of frames consecutively according to the selection priority and selects one of a plurality of antennas on standby except the antenna in actual use as the antenna to be measured once at the period of a plurality of frames, the antenna selection section selecting the antenna to be measured as the antenna in actual use when a mean value of the reception level of the antenna in actual use is smaller than a mean value of the reception level of the antenna to be measured and selecting the next antenna to be measured according to the selection priority.

An antenna selection diversity reception method of the present invention comprises the steps of storing antenna gains of three or more antennas as information indicating selection priority beforehand, selecting one of the three or more antennas as an antenna in actual use within a period of a plurality of frames consecutively according to the selection priority, measuring the reception levels of the antenna in actual use and antenna to be measured by selecting one of a plurality of antennas on standby except the antenna in actual use as an antenna to be measured once at the period of a plurality of frames, monitoring whether the measured reception level of the antenna in actual use falls below the reception level of the antenna to be measured a predetermined number of times consecutively or not, selecting the antenna to be measured as the antenna in actual use when the above described case occurs consecutively, selecting the next antenna to be measured according to the selection priority and changing the antenna to be measured according to the selection priority when the above described case does not occur the predetermined number of times consecutively.

An antenna selection diversity reception method of the present invention comprises the steps of storing antenna gains of three or more antennas as information indicating selection priority beforehand, selecting one of the three or more antennas as an antenna in actual use within a period of a plurality of frames consecutively according to the selection priority, measuring the reception levels of the antenna in actual use and the antenna to be measured by selecting one of a plurality of antennas on standby except the antenna in actual use as an antenna to be measured once at the period of a plurality of frames, averaging the measured reception level of the antenna in actual use and the reception level of the antenna to be measured corresponding to a predetermined number of times respectively, selecting the antenna to be measured as the antenna in actual use when a mean value of the reception level of the antenna in actual use is smaller than a mean value of the reception level of the antenna to be measured and selecting the next antenna to be measured according to the selection priority.

An antenna selection diversity reception method of the present invention comprises the steps of storing antenna gains of three or more antennas as information indicating selection priority beforehand, selecting one of the three or more antennas as an antenna in actual use within a period of a plurality of frames consecutively according to the selection priority, measuring the reception level of the antenna to be measured by selecting one of a plurality of antennas on standby except the antenna in actual use as an antenna to be measured once at the period of a plurality of frames, averaging the measured reception level of the antenna to be measured corresponding to a predetermined number of times, calculating the reception levels of the antenna to be measured and antenna in actual use at an AGC voltage value using a convergence AGC voltage and a reception level vs. AGC voltage characteristic provided before hand during reception processing on the received signal of the antenna in actual use selected within a period of a plurality of frames consecutively, selecting the antenna to be measured as the antenna in actual use when the calculated reception level of the antenna in actual use is smaller than a mean value of the reception level of the antenna to be measured and selecting the next antenna to be measured according to the selection priority.

ADVANTAGEOUS EFFECT OF THE INVENTION

In accordance with the present invention, when antennas are switched in frame units, it is possible to shorten an antenna measuring time and shorten the time for selecting an optimal antenna from among a plurality of antennas on standby, and thereby realize antenna selection diversity even when a non-TDMA communication scheme is used.

BEST MODE FOR CARRYING OUT THE INVENTION

Now, embodiments of the present invention will be described in detail with reference to the attached drawings.

EMBODIMENT 1

Figure 1:
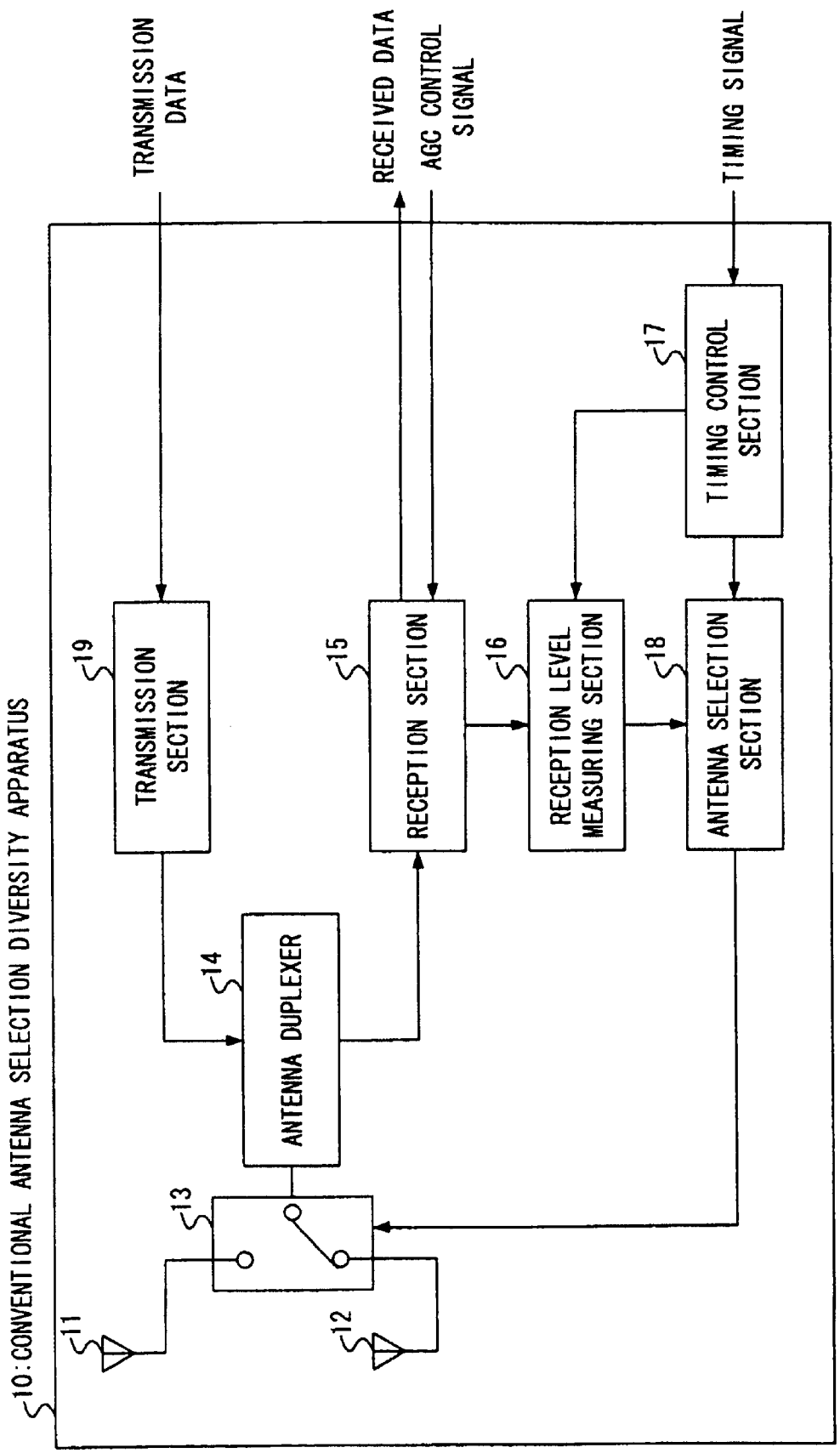
FIG. 1 is a block diagram showing a configuration example of a conventional antenna selection diversity apparatus.
Figure 2:
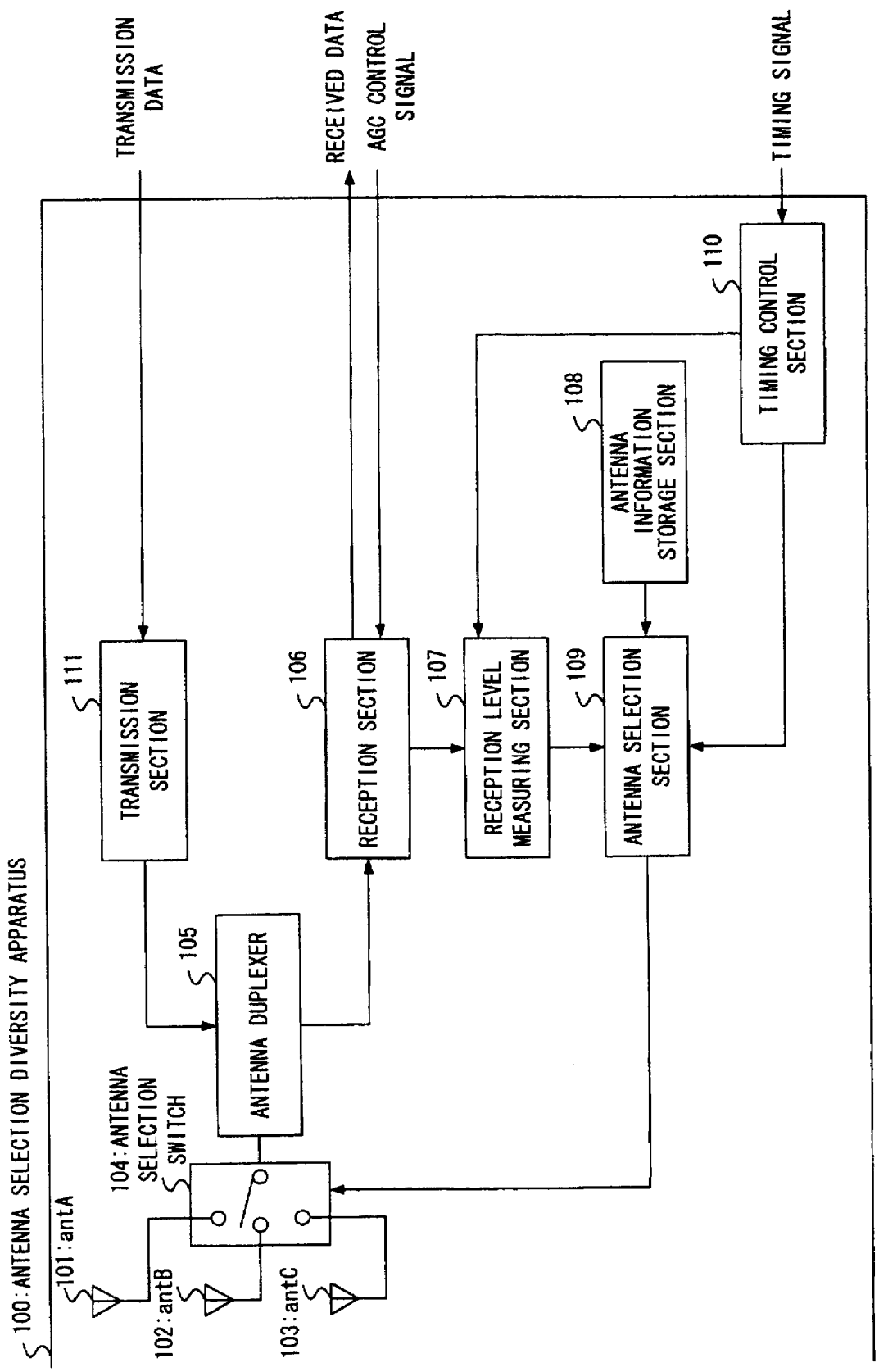
FIG. 2 is a block diagram showing the configuration of an antenna selection diversity apparatus according to Embodiment 1 of the present invention.

FIG. 2 is a block diagram showing the configuration of an antenna selection diversity apparatus according to Embodiment 1 of the present invention. The antenna selection diversity apparatus 100 shown in FIG. 2 is provided with an antenna 101 (hereinafter referred to as "antA"), an antenna 102 (hereinafter referred to as "antB") and an antenna 103 (hereinafter referred to as "antC"), an antenna selection switch 104, an antenna duplexer 105, a reception section 106, a reception level measuring section 107, an antenna information storage section 108, an antenna selection section 109, a timing control section 110 and a transmission section 111. Here, amplifiers and filters, etc., are omitted.

In this embodiment, any one of antA, antB and antC becomes an antenna in actual use and the remaining two become antennas on standby. One of the two antennas on standby becomes an antenna to be measured whose reception level is compared with that of the antenna in actual use. This relationship is the same also when there are three or more antennas on standby. In short, the number of antennas on standby needs to be at least two, and therefore FIG. 2 shows a case of a minimum configuration with three antennas to facilitate an understanding.

The antenna selection switch 104 selects any one of antA, antB and antC according to an antenna selection signal input from the antenna selection section 109 and connects the selected antenna to the antenna duplexer 105. This allows transmission data converted by the transmission section 111 to a radio signal to be transmitted by radio from the selected antenna through the antenna duplexer 105 and antenna selection switch 104. Furthermore, the received signal of the selected antenna is input to the reception section 106 through the antenna selection switch 104 and antenna duplexer 105.

The reception section 106 outputs the received data extracted from the received signal to a reception processing system (not shown) and gives the received signal to the reception level measuring section 107. At this time, the reception section 106 fixes an AGC voltage to a constant voltage according to an AGC control signal input from a control system (not shown) within a reception level measurement period.

The reception level measuring section 107 measures the reception level at a measurement timing of the antenna in actual use instructed by the timing control section 110 and at a measurement timing of the antenna to be measured and gives both measurement results to the antenna selection section 109.

The antenna information storage section 108 stores antenna gains of antA, antB, antC in an ideal radio wave propagation environment beforehand in a relationship of, for example, anta>antB>antC. This magnitude relationship among antenna gains indicates antenna selection priority.

Based on the magnitude relationship among antenna gains stored in the antenna information storage section 108, the antenna selection section 109 selects an antenna in actual use and an antenna to be measured and gives an antenna selection signal to the antenna selection switch 104 according to the selection period of the antenna in actual use and the selection period of the antenna to be measured instructed from the timing control section 110. Then, the antenna selection section 109 compares both measurement results input from the reception level measuring section 107 and decides whether to maintain the antenna in actual use as is or change the antenna. Since there are two antennas on standby, the antenna selection section 109 also switches between the antennas on standby.

Figure 3:
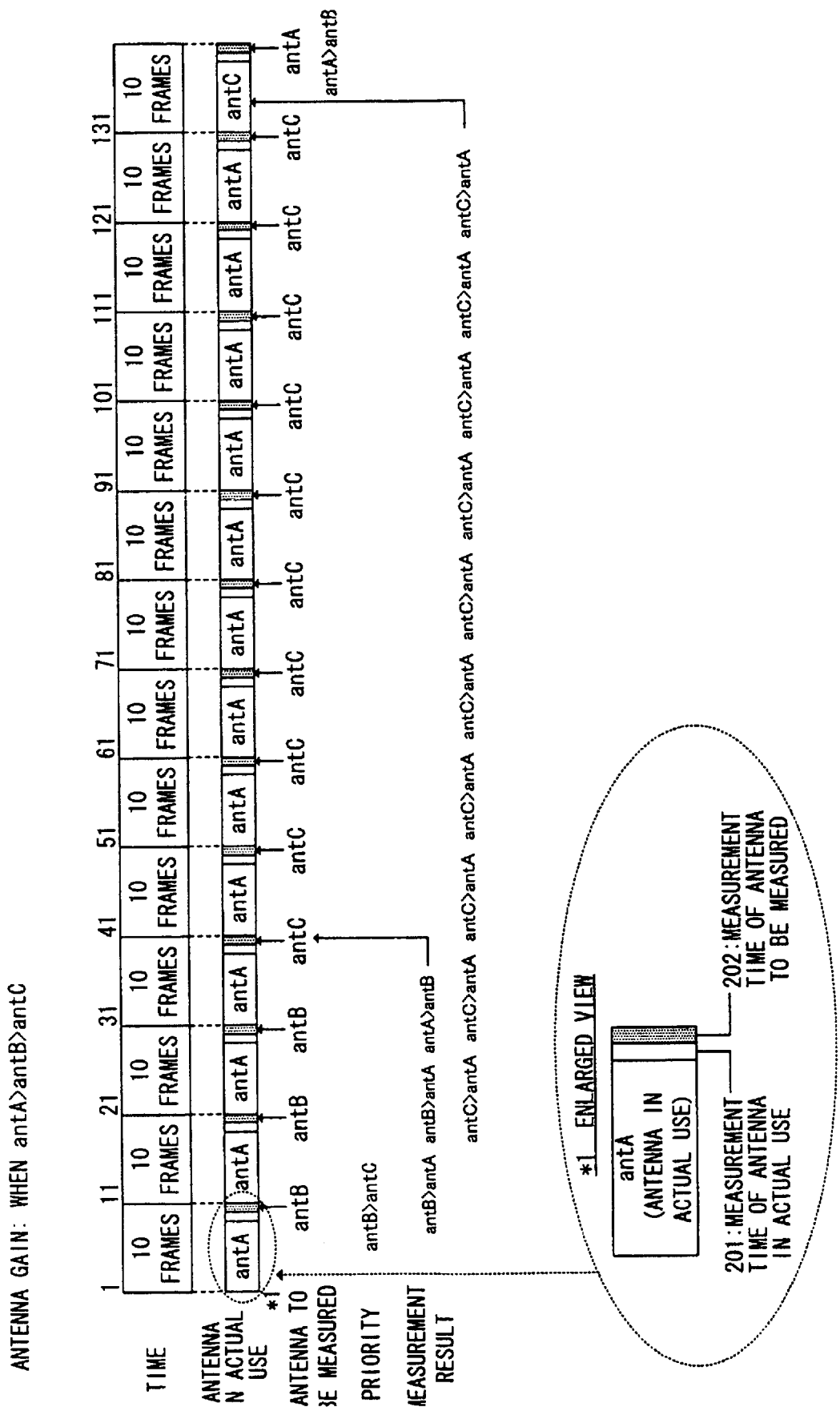
FIG. 3 illustrates an antenna selection operation of the antenna selection diversity apparatus shown in FIG. 2.

In addition to shortening the selection period of the antenna to be measured considerably as (selection period of antenna in actual use)>>(selection period of antenna to be measured), this Embodiment 1 sets the frequency of measurement to once every plurality of frames and selects an appropriate antenna depending on whether (reception level of antenna in actual use)<(reception level of antenna to be measured) a plurality of times consecutively or not. This will be explained more specifically according to FIG. 3 below. FIG. 3 illustrates an antenna selection operation of the antenna selection diversity apparatus shown in FIG. 2.

FIG. 3 shows a selection operation when the reception level is measured every 10 frames. In this case, the antenna selection section 109 causes the antenna selection switch 104 to select the antenna in actual use consecutively for a period of first 9 frames and select the antenna to be measured for a period of 1 frame that follows. An antenna-in-actual-use measuring time 201 during which the reception level measuring section 107 measures the reception level of the antenna in actual use is set in the last frame (ninth frame) in the period of the first 9 frames and an antenna-to-be-measured measuring time 202 during which the reception level measuring section 107 measures the reception level of the antenna to be measured is set in the tenth frame. Furthermore, the antenna selection section 109 monitors the number of times the two reception levels become equal consecutively and that number of times is set to 10.

As shown in FIG. 3, the antenna selection section 109 initially decides antA having the largest gain as the antenna in actual use and decides antB having the second largest gain as the antenna to be measured. In the first measurement (frame 1 to frame 10) and second measurement (frame 11 to frame 20), antB>antA but in the third measurement (frame 21 to frame 30), antB<antA.

In this case, since it is understandable that originally antB<antA, but due to influences of fading, antB>antA temporarily, the antenna selection section 109 changes the antenna to be measured from the antB to antC. This measure prevents a selection of a wrong antenna, that is, selecting antB as the antenna in actual use.

From the fourth measurement (frame 31 to frame 40) onward, the reception levels of antA and antC are compared. In the example in the figure, since antA<antC 10 times consecutively from the fourth measurement (frame 31 to frame 40) to the 13th measurement (frame 121 to frame 130), the antenna selection section 109 changes the antenna in actual use from antA to antC. Therefore, the antenna in actual use becomes antC from the 14th measurement (frame 131 to frame 140) onward. This allows the antenna which is suitable for the actual radio wave propagation environment to be selected as an antenna in actual use. Since the gains of the antennas on standby antA, antB are antA>antB, antA is selected as the antenna to be measured first.

Thus, according to this Embodiment 1, measurement is performed once every plurality of frames, and therefore it is possible to shorten the measuring time of the antenna to be measured. Even if the reception level of the antenna to be measured is greater than that of the antenna in actual use, if that state does not continue a predetermined number of times consecutively, the antenna to be measured is changed and a new antenna to be measured is selected as the antenna in actual use when the reception level of the antenna continues to be greater a predetermined number of times consecutively, and therefore it is possible to shorten the time during which an optimal antenna is selected from among a plurality of antennas on standby and also prevent a selection of a wrong antenna due to influences of fading, etc.

EMBODIMENT 2

Figure 4:
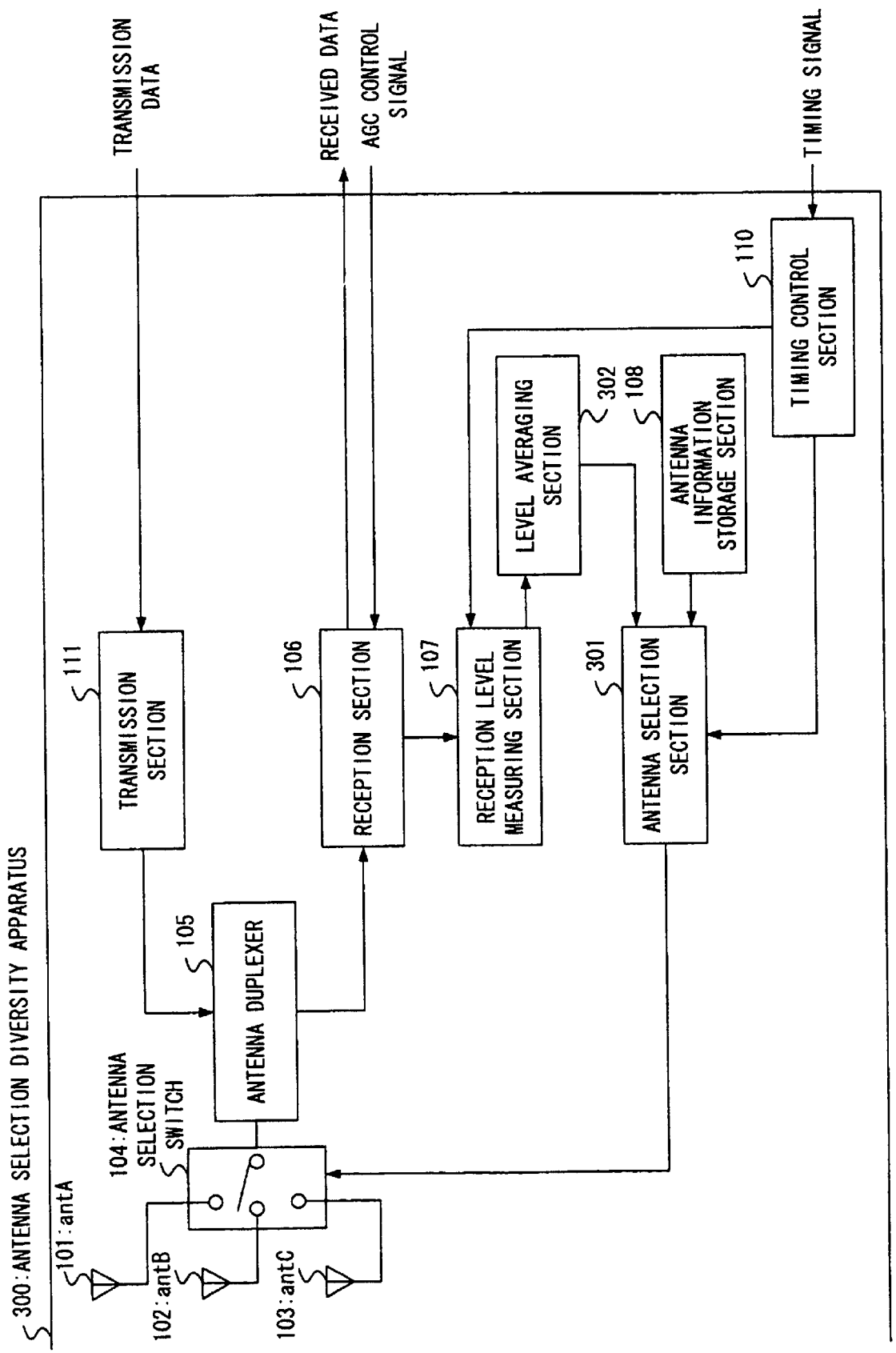
FIG. 4 is a block diagram showing the configuration of an antenna selection diversity apparatus according to Embodiment 2 the present invention.

FIG. 4 is a block diagram showing the configuration of an antenna selection diversity apparatus 300 according to Embodiment 2 of the present invention. In FIG. 4, components identical or equivalent to those shown in FIG. 2 (Embodiment 1) are assigned the same reference numerals. Here, mainly parts related to this Embodiment 2 will be explained.

As shown in FIG. 4, in this Embodiment 2, the configuration shown in FIG. 2 is provided with an antenna selection section 301 instead of the antenna selection section 109 and a level averaging section 302 provided between the reception level measuring section 107 and antenna selection section 301.

As in the case of Embodiment 1, the reception level measuring section 107 measures the reception levels of an antenna in actual use and an antenna to be measured once every 10 frames, but in Embodiment 2, both measurement results of the reception level measuring section 107 are input to the level averaging section 302.

The level averaging section 302 averages both measurement results of the reception level measuring section 107 a predetermined number of times (e.g., 10 times) and gives the averaging results to the antenna selection section 301.

The antenna selection section 301 compares a mean value of the reception level of the antenna in actual use and a mean value of the reception level of the antenna to be measured input from the level averaging section 302 and decides whether the antenna in actual use needs to be changed or not. That is, when (mean value of the reception level of the antenna in actual use)>(mean value of the reception level of the antenna to be measured), the antenna selection section 301 maintains the selection of the antenna in actual use. On the other hand, when (mean value of the reception level of the antenna in actual use)<(mean value of the reception level of the antenna to be measured), the antenna selection section 301 changes the antenna in actual use to the antenna to be measured. This will be explained more specifically according to FIG. 5.

Figure 5:
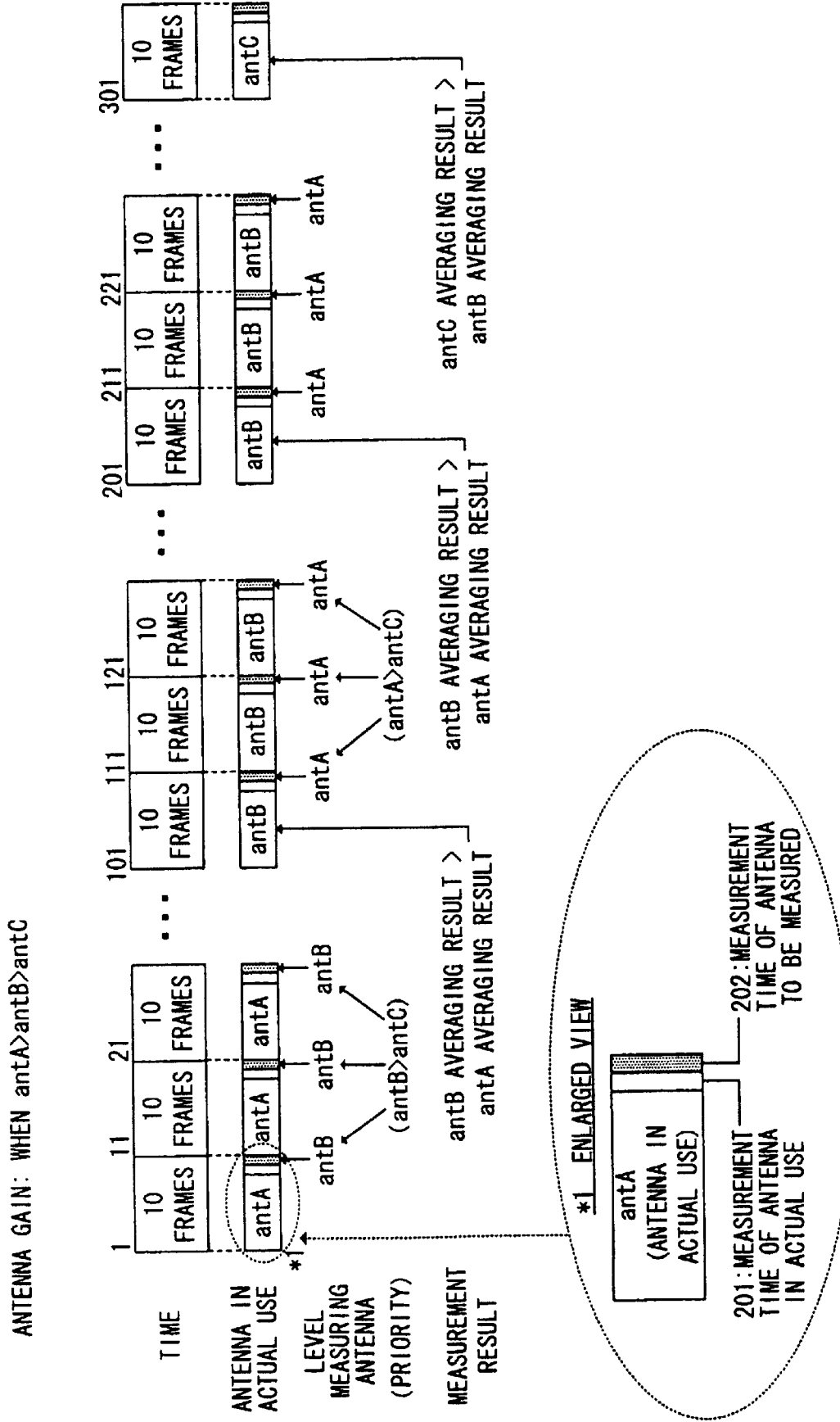
FIG. 5 illustrates an antenna selection operation of the antenna selection diversity apparatus shown in FIG. 4.

FIG. 5 illustrates an antenna selection operation of the antenna selection diversity apparatus 300 shown in FIG. 4. FIG. 5 shows a case where the reception level is measured every 10 frames and a selection operation is performed every 100 frames. As in the case of FIG. 3, FIG. 5 shows that the reception level measurement periods of the antenna in actual use and antenna to be measured are set in the ninth frame and the 10th frame within a period of 10 frames. As in the case of the antenna selection section 109, the antenna selection section 301 causes the antenna selection switch 104 to switch between the antenna in actual use and antenna to be measured in such a timing relationship. Then, unlike the antenna selection section 109, every time both mean values of the reception levels are input from the level averaging section 302, the antenna selection section 301 compares both reception levels and decides whether or not to change antennas.

As shown in FIG. 5, the antenna selection section 301 decides antA having the largest gain as an antenna in actual use and decides antB having the second largest gain as an antenna to be measured. During the first antenna selection period (frame 1 to frame 100), mean values of the reception levels of antA and antB are antB>antA ten times, and therefore the antenna selection section 301 changes the antenna in actual use from antA to antB and shifts to the next selection period.

During the second antenna selection period (frame 101 to frame 200), since the gains of the antennas on standby antA, antC are antA>antC, and therefore antA is selected as the antenna to be measured. Then, since mean values of the reception levels of antB and antA are antB>antA ten times as with the previous time, the antenna selection section 301 maintains the selection of antB as the antenna in actual use and shifts to the next selection period.

In the third antenna selection period (frame 201 to frame 300), the gains of the antenna on standby antA, antC are antA>antC, but antA was selected previously, and therefore antC is selected as the antenna to be measured. Then, since mean values of the reception levels of antB and antC are antC>antB 10 times, the antenna selection section 301 changes antB to antC as the antenna in actual use and shifts to the next selection period.

Thus, according to this Embodiment 2, measurement is performed once every plurality of frames, and therefore it is possible to shorten the measuring time of an antenna to be measured. Furthermore, whether antennas should be switched or not is decided based on a comparison between both reception levels obtained by averaging the reception levels of the antenna in actual use and antenna to be measured a predetermined number of times, and therefore it is possible to shorten the time for selecting an optimal antenna from among a plurality of antennas on standby and prevent a selection of a wrong antenna due to influences of fading, etc.

EMBODIMENT 3

Figure 6:
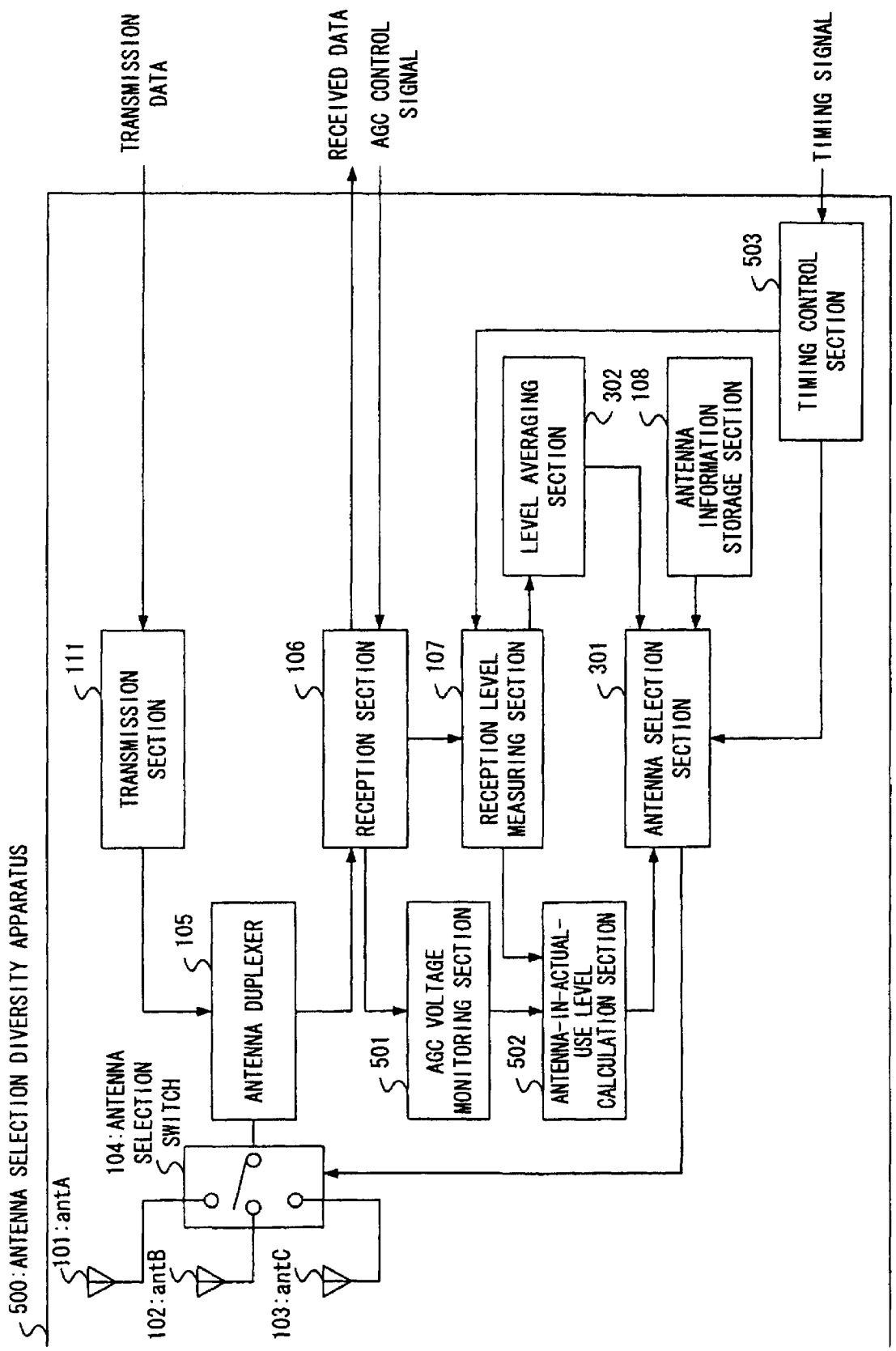
FIG. 6 is a block diagram showing the configuration of an antenna selection diversity apparatus according to Embodiment 3 the present invention.

FIG. 6 is a block diagram showing the configuration of an antenna selection diversity apparatus 500 according to Embodiment 3 the present invention. In FIG. 6, components identical or equivalent to those shown in FIG. 4 (Embodiment 2) are assigned the same reference numerals. Here, mainly parts related to this Embodiment 3 will be explained.

As shown in FIG. 6, in this Embodiment 3, an AGC voltage monitoring section 501 and antenna-in-actual-use level calculation section 502 are added to the configuration shown in FIG. 4 (Embodiment 2) and a timing control section 503 is provided instead of the timing control section 110.

The timing control section 503 gives an instruction for selecting an antenna to be measured to the antenna selection section 301 every plurality of frames, but the timing control section 503 does not give any instruction for measurement of the reception level of the antenna in actual use and gives only an instruction for measurement of the reception level of the antenna to be measured to the reception level measuring section 107.

The reception level of the antenna in actual use to be compared with the reception level of the antenna to be measured is obtained through a calculation. That is, an AGC voltage during AGC control at the reception section 106 converges to a constant AGC convergence level, and therefore the AGC voltage monitoring section 501 monitors the AGC voltage, the antenna-in-actual-use level calculation section 502 calculates the reception level of the antenna in actual use under the same condition (same AGC voltage) as that of the antenna to be measured using the method shown in FIG. 8 from the AGC convergence value from the AGC voltage monitoring section 501, antenna-in-actual-use convergence level, AGC set value (fixed) of the antenna to be measured and reception level vs. AGC voltage characteristic and gives the reception level to the antenna selection section 301.

Figure 7:
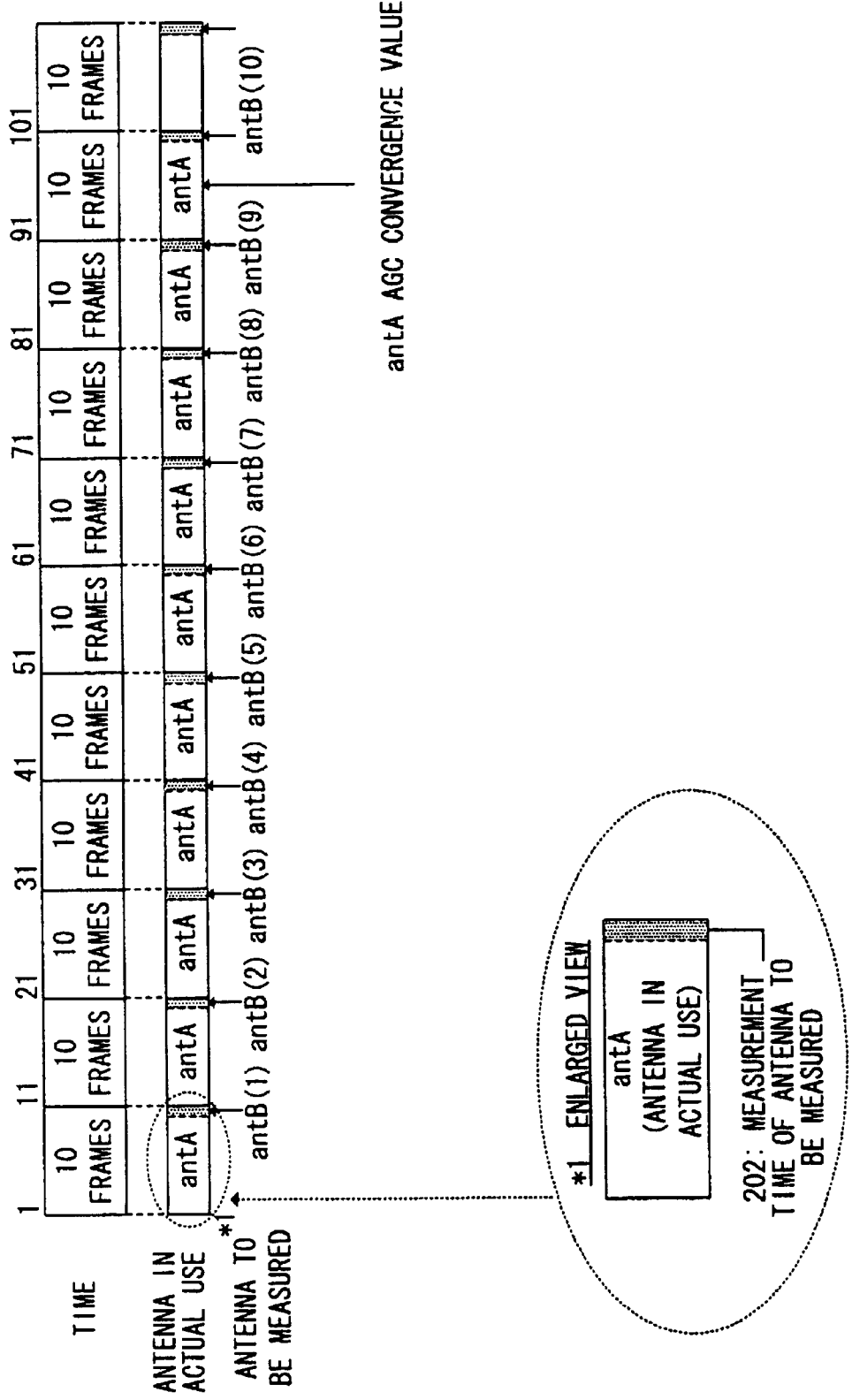
FIG. 7 illustrates an antenna selection operation of the antenna selection diversity apparatus shown in FIG. 6.

Therefore, the antenna selection operation according to this Embodiment 3 is as shown in FIG. 7. FIG. 7 illustrates an antenna selection operation of the antenna selection diversity apparatus shown in FIG. 6. As in the case of FIG. 5, FIG. 7 shows the case where the reception level is measured every 10 frames and a selection operation is performed every 100 frames. FIG. 7 shows that the reception level measuring section 107 performs measurement only during an antenna-to-be-measured measuring time 202 provided at the 10th frame.

FIG. 7 shows the first antenna selection period (frame 1 to frame 100) in FIG. 5. As shown in FIG. 7, the antenna selection section 301 initially decides antA having the largest gain as the antenna in actual use and decides antB having the second largest gain as the antenna to be measured. During the first antenna selection period (frame 1 to frame 100), the antenna selection section 301 compares a mean value of the reception level (antB(1) to antB(10)) ten times from the level averaging section 302 and the AGC convergence value of antA from the antenna-in-actual-use level calculation section 502.

Figure 8:
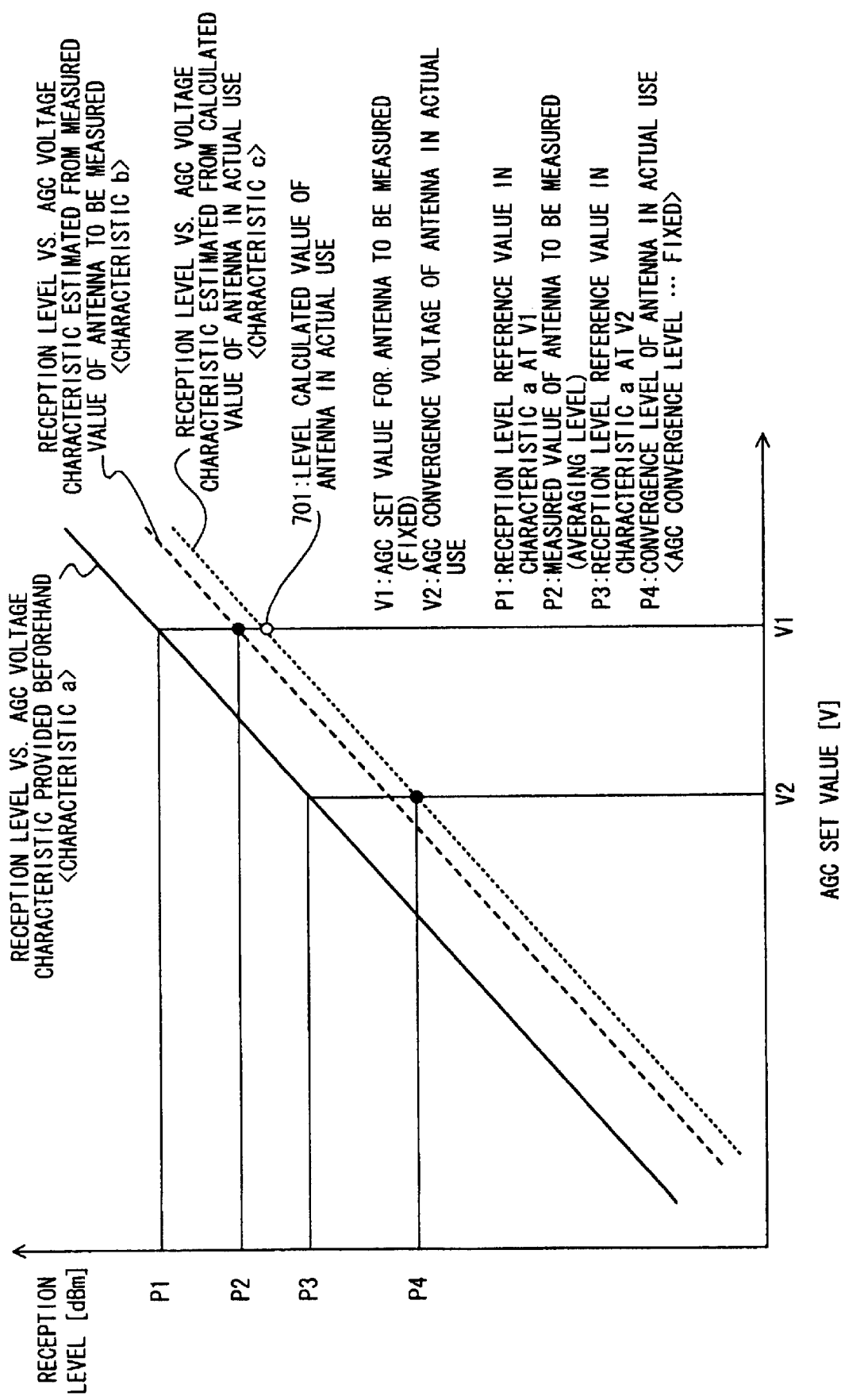
FIG. 8 illustrates a level calculation operation of the antenna in actual use carried out by the antenna-in-actual-use level calculation section shown in FIG. 6.

Next, FIG. 8 illustrates a level calculation operation of the antenna in actual use carried out by the antenna-in-actual-use level calculation section shown in FIG. 6. In FIG. 8, the horizontal axis shows an AGC set value [V] and shows the relationship between an AGC set value (fixed value) for the antenna to be measured V1 and AGC convergence voltage for the antenna in actual use V2 as V1>V2>0. The vertical axis shows a reception level [dBm] and shows a reception level reference value P1 and a measured value (averaging level) of the antenna to be measured P2 at the AGC set value V1 for the antenna to be measured in a characteristic a, a reception level reference value P3 in a characteristic b at an antenna-in-actual-use AGC convergence voltage V2 and an antenna-in-actual-use convergence level (AGC convergence level: fixed value) P4 in a relationship of P1>P2>P3>P4>0.

Furthermore, the characteristic a is a reception level vs. AGC voltage characteristic provided beforehand for the antenna-in-actual-use level calculation section 502. A characteristic b is a reception level vs. AGC voltage characteristic estimated from a measured value of the antenna to be measured. A characteristic c is a reception level vs. AGC voltage characteristic estimated from a calculated value of the antenna in actual use.

Using the characteristic a as a reference characteristic, a comparison is made using the difference between this reference characteristic and antenna characteristic. First, the antenna-in-actual-use AGC convergence voltage V2 is monitored and the reception level reference value P3 at this antenna-in-actual-use AGC convergence voltage V2 is obtained from the characteristic a. The antenna-in-actual-use convergence level P4 is a fixed value as the AGC convergence level at the antenna-in-actual-use AGC convergence voltage V2. Therefore, "P3–P4" is the difference from the reference value of the antenna in actual use, and therefore it is possible to obtain an antenna-in-actual-use level 701 at the AGC set value V1 for the antenna to be measured by subtracting "P3–P4" from the reception level reference value P1 at the AGC set value V1 for the antenna to be measured and compare it with the antenna to be measured at the same AGC voltage. That is, a comparison is made between the antenna-to-be-measured averaging level P2 and the antenna-in-actual-use level calculated value "P1–(P3–P4)" 701 at the AGC set value for the antenna to be measured V1.

Thus, according to this Embodiment 3, it is possible to save the measuring time of the antenna in actual use and thereby further shorten the antenna measuring time.

EMBODIMENT 4

Figure 9:
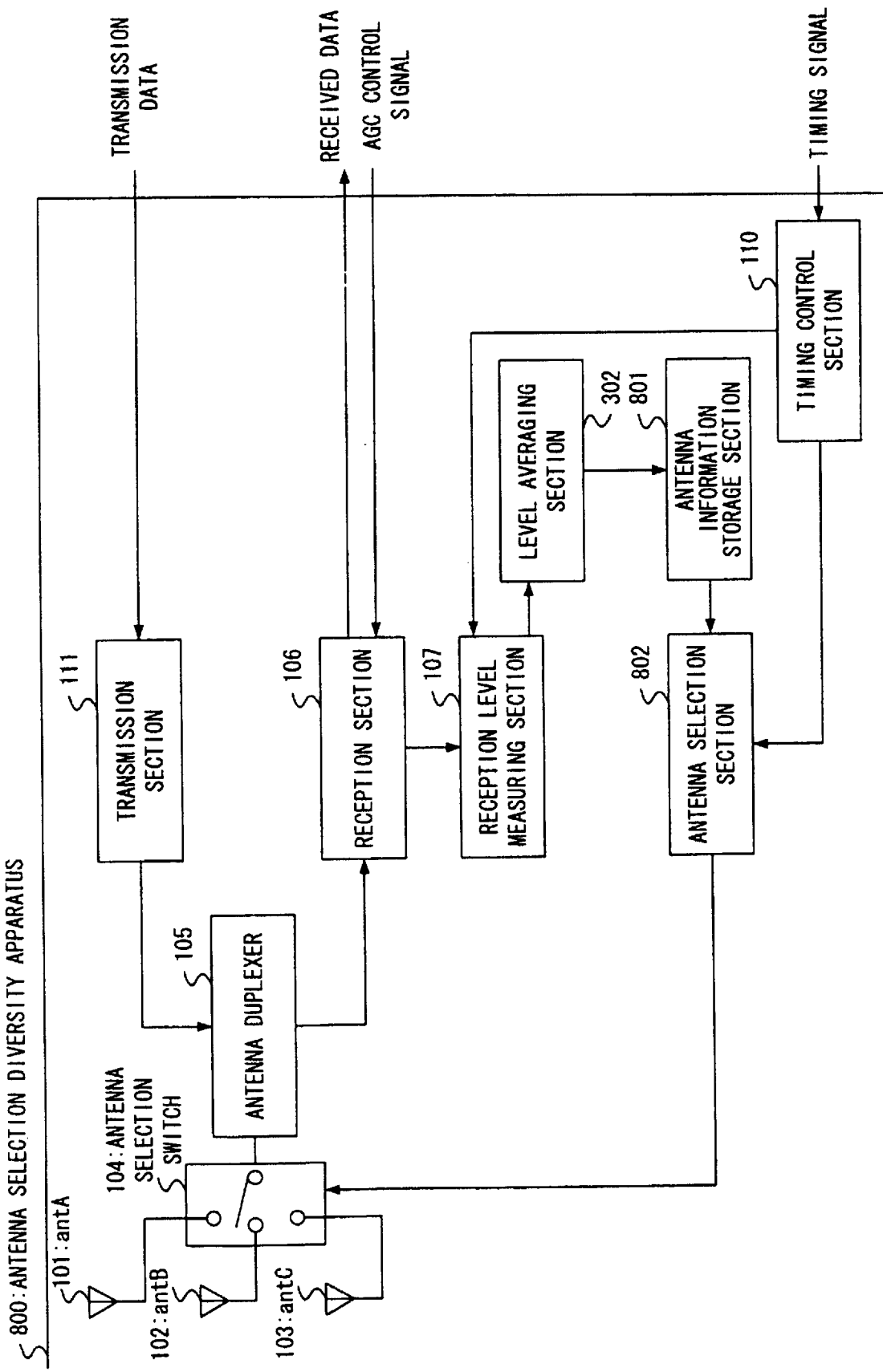
FIG. 9 is a block diagram showing the configuration of an antenna selection diversity apparatus according to Embodiment 4 the present invention.

FIG. 9 is a block diagram showing the configuration of an antenna selection diversity apparatus 800 according to Embodiment 4 the present invention. In FIG. 9, the components identical or equivalent to those shown in FIG. 4 (Embodiment 2) are assigned the same reference numerals. Here, mainly parts related to Embodiment 4 will be explained.

As shown in FIG. 9, this Embodiment 4 corresponds to the configuration shown in FIG. 4 (Embodiment 2) provided with an antenna information storage section 801 instead of the antenna information storage section 108 and an antenna selection section 802 instead of the antenna selection section 301.

As in the case of the antenna information storage section 108, the antenna information storage section 801 stores antenna gains of antennas 101 to 103. This Embodiment 4 is provided with the function of reflecting an averaging result at the level averaging section 302 for those antenna gains, that is, the function of increasing/decreasing the gain of the antenna selected as the antenna in actual use and the gain of the antenna selected as the antenna to be measured according to the averaging result at the level averaging section 302.

Unlike the antenna selection section 301, the antenna selection section 802 performs a selection operation by selecting an antenna in actual use and an antenna to be measured based on the antenna gains stored in the antenna information storage section 801 from the beginning and then examining, instead of performing a selection operation based on the averaging result at the level averaging section 302, the selection priority from the antenna gains which are made to reflect the averaging result at the level averaging section 302 in the antenna information storage section 801.

Thus, according to this Embodiment 4, an antenna measurement result is always reflected in antenna gains and it is thereby possible to update selection priority information at any time. Therefore, a cellular phone provided with the antenna selection diversity apparatus shown in FIG. 9 can be expected to provide the effect of learning an optimal antenna for the user for an antenna with a nature susceptible to influences of the human body such as the way how the package of the cellular phone is held or how the cellular phone contacts the ear. Furthermore, by using this function according to the mode of use (conversation, Internet, etc.), the invention may also be adapted so as to learn an optimal antenna for the user in each mode.

EMBODIMENT 5

Figure 10:
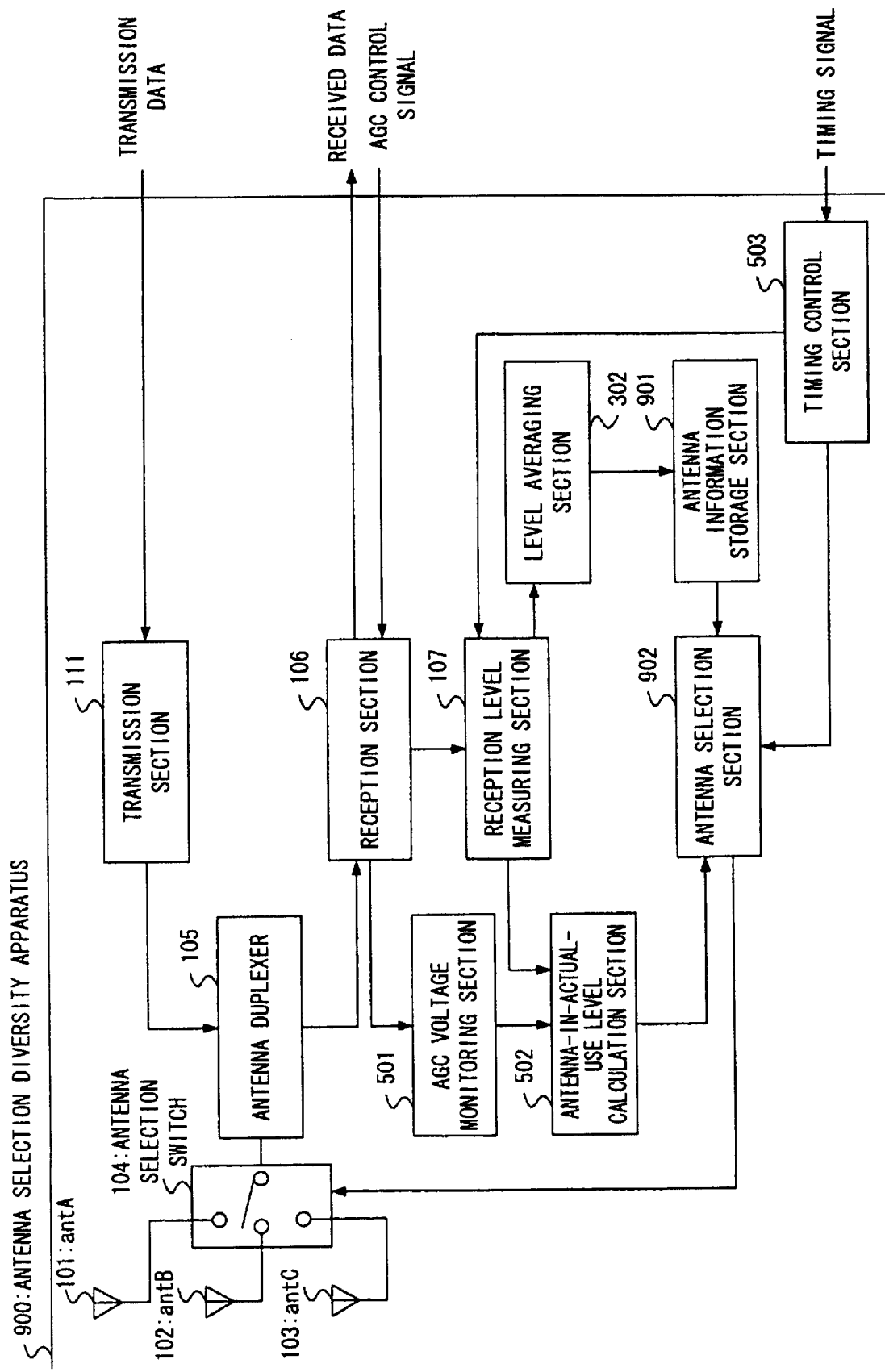
FIG. 10 is a block diagram showing the configuration of an antenna selection diversity apparatus according to Embodiment 5 the present invention.

FIG. 10 is a block diagram showing the configuration of an antenna selection diversity apparatus 900 according to Embodiment 5 the present invention. In FIG. 10, components identical or equivalent to those shown in FIG. 6 (Embodiment 3) are assigned the same reference numerals. Here, mainly parts related to Embodiment 5 will be explained.

As shown in FIG. 10, this Embodiment 5 has the configuration shown in FIG. 6 (Embodiment 3) provided with an antenna information storage section 901 instead of the antenna information storage section 108 and an antenna selection section 902 instead of the antenna selection section 301.

As in the case of the antenna information storage section 108, the antenna information storage section 901 stores antenna gains of antennas 101 to 103, but this Embodiment 5 has the function of reflecting averaging results at the level averaging section 302 in those antenna gains, that is, the function of increasing/decreasing the gain of an antenna selected as an antenna in actual use and the gain of an antenna selected as an antenna to be measured according to the averaging results at the level averaging section 302.

The antenna selection section 902 performs a selection operation by initially selecting an antenna in actual use and an antenna to be measured based on the antenna gains stored in the antenna information storage section 901 and then examining selection priority from the antenna gains which are made to reflect the averaging results at the level averaging section 302 in the antenna information storage section 901 and comparing this with the calculated value from the antenna-in-actual-use level calculation section 502.

Thus, this Embodiment 5 always makes an antenna measurement result reflect in the antenna gain, and can thereby update selection priority information at any time. Therefore, a cellular phone provided with the antenna selection diversity apparatus shown in FIG. 10 can be expected to provide the effect of learning an optimal antenna for the user for an antenna with a nature susceptible to influences of the human body such as the way how the package of the cellular phone is held or how the cellular phone contacts the ear. Furthermore, by using this function according to the mode of use (conversation, Internet, etc.), the invention may also be adapted so as to learn an optimal antenna for the user in each mode.

The present application is based on Japanese Patent Application No. 2003-377499 filed on Nov. 6, 2003, entire content of which is expressly incorporated by reference herein.

INDUSTRIAL APPLICABILITY

The present invention is particularly suitable for use in realizing antenna selection diversity with a cellular phone and base station using a communication scheme other than TDMA

The invention claimed is:

1. An antenna selection diversity apparatus comprising:
three or more antennas;
an antenna information storage section that stores antenna gains of said three or more antennas as information indicating selection priority;
a reception level measuring section that measures the reception level of an antenna in actual use selected within a period of a plurality of frames consecutively and the reception level of an antenna to be measured selected once at said period of a plurality of frames; and
an antenna selection section that selects one of said three or more antennas as said antenna in actual use within a period of a plurality of frames consecutively according to said selection priority and selects one of a plurality of antennas on standby except said antenna in actual use as said antenna to be measured once at said period of a plurality of frames, said antenna selection section selecting said antenna to be measured as the antenna in actual use when the reception level of the antenna in actual use measured by said reception level measuring section falls below the reception level of the antenna to be measured a predetermined number of times consecutively, selecting the next antenna to be measured according to said selection priority and changing the antenna to be measured according to said selection priority when the reception level of the antenna in actual use measured by said reception level measuring section fails below the reception level of the antenna to be measured.

2. An antenna selection diversity apparatus comprising:
three or more antennas;
an antenna information storage section that stores antenna gains of said three or more antennas as information indicating selection priority;
a reception level measuring section that measures the reception level of an antenna in actual use selected within a period of a plurality of frames consecutively and the reception level of an antenna to be measured selected once at said period of a plurality of frames;
a level averaging section that averages the reception level of the antenna in actual use measured by said reception level measuring section and the reception level of the antenna to be measured corresponding to a predetermined number of times respectively; and
an antenna selection section that selects one of said three or more antennas as said antenna in actual use within a period of a plurality of frames consecutively according to said selection priority and selects one of a plurality of antennas on standby except said antenna in actual use as said antenna to be measured once at said period of a plurality of frames, said antenna selection section selecting said antenna to be measured as the antenna in actual use when a mean value of the reception level of said antenna in actual use calculated by said level averaging section is smaller than a mean value of the reception level of said antenna to be measured and selecting the next antenna to be measured according to said selection priority.

3. The antenna selection diversity apparatus according to claim 2, wherein said antenna information storage section comprises a function of receiving a mean value of the reception level of an antenna in actual use output by said level averaging section and mean value of the reception level of an antenna to be measured, reflecting the mean values in corresponding antenna gains and updating selection priority, and
said antenna selection section selects said antenna to be measured as the antenna in actual use when priority of the antenna in actual use updated by said antenna information storage section is lower than priority of the antenna to be measured and selects the next antenna to be measured according to said selection priority.

4. An antenna selection diversity apparatus comprising:
three or more antennas;
an antenna information storage section that stores antenna gains of said three or more antennas as information indicating selection priority;
a reception level measuring section that measures the reception level of an antenna to be measured selected once at a period of a plurality of frames;
a level averaging section that averages the reception level of the antenna to be measured by said reception level measuring section corresponding to a predetermined number of times;
an antenna-in-actual-use reception level calculation section that calculates the reception levels of said antenna to be measured and the antenna in actual use at an AGC voltage value using a convergence AGC voltage and a reception level vs. AGC voltage characteristic provided beforehand during reception processing on the received signal of the antenna in actual use selected within a period of a plurality of frames consecutively; and
an antenna selection section that selects one of said three or more antennas as the antenna in actual use within a period of a plurality of frames consecutively according to said selection priority and selects one of a plurality of antennas on standby except said antenna in actual use as said antenna to be measured once at said period of a plurality of frames, said antenna selection section selecting said antenna to be measured as the antenna in actual use when the calculated reception level of said antenna in actual use is smaller than a mean value of the reception level of said antenna to be measured and selecting the next antenna to be measured according to said selection priority.

5. The antenna selection diversity apparatus according to claim 4, wherein said antenna information storage section comprises the function of receiving a mean value of the reception level of the antenna to be measured output by said level averaging section, reflecting the mean value in the antenna gains and updating selection priority, and
said antenna selection section selects said antenna to be measured as the antenna in actual use when said calculated reception level of said antenna in actual use is lower than the priority of the antenna to be measured updated by said antenna information storage section and selects the next antenna to be measured according to said selection priority.

6. An antenna selection diversity reception method comprising the steps of:
storing antenna gains of three or more antennas as information indicating selection priority beforehand;
selecting one of said three or more antennas as an antenna in actual use within a period of a plurality of frames consecutively according to said selection priority;
measuring the reception levels of said antenna in actual use and said antenna to be measured by selecting one of a plurality of antennas on standby except said antenna in actual use as an antenna to be measured once at said period of a plurality of frames;
monitoring whether the measured reception level of the antenna in actual use falls below the reception level of the antenna to be measured a predetermined number of times consecutively or not;
selecting said antenna to be measured as the antenna in actual use when said case occurs consecutively;
selecting the next antenna to be measured according to said selection priority; and
changing the antenna to be measured according to said selection priority when the reception level of the antenna in actual use measured by said reception level measuring section falls below the reception level of the antenna to be measured.

7. An antenna selection diversity reception method comprising the steps of:
storing antenna gains of three or more antennas as information indicating selection priority beforehand;
selecting one of said three or more antennas as an antenna in actual use within a period of a plurality of frames consecutively according to said selection priority;
measuring the reception levels of said antenna in actual use and said antenna to be measured by selecting one of a plurality of antennas on standby except said antenna in actual use as an antenna to be measured once at said period of a plurality of frames;
averaging the measured reception level of the antenna in actual use and the reception level of the antenna to be measured corresponding to a predetermined number of times respectively;
selecting said antenna to be measured as the antenna in actual use when a mean value of the reception level of said antenna in actual use is smaller than a mean value of the reception level of said antenna to be measured; and
selecting the next antenna to be measured according to said selection priority.

8. The antenna selection diversity reception method according to claim 7, wherein a mean value of the reception level of said antenna in actual use and mean value of the reception level of said antenna to be measured are reflected in the corresponding antenna gains of the respective antenna gains of said prestored three or more antennas to update selection priority, said antenna to be measured is selected as an antenna in actual use when the priority of the updated antenna in actual use is lower than the priority of the antenna to be measured and the next antenna to be measured is selected according to said selection priority.

9. An antenna selection diversity reception method comprising the steps of:
storing antenna gains of three or more antennas as information indicating selection priority beforehand;
selecting one of said three or more antennas as an antenna in actual use within a period of a plurality of frames consecutively according to said selection priority;
measuring the reception level of said antenna to be measured by selecting one of a plurality of antennas on standby except said antenna in actual use as an antenna to be measured once at said period of a plurality of frames;

averaging the measured reception level of the antenna to be measured corresponding to a predetermined number of times;

calculating the reception levels of said antenna to be measured and said antenna in actual use at an AGC voltage value using a convergence AGC voltage and a reception level vs. AGC voltage characteristic provided beforehand during reception processing on the received signal of said antenna in actual use selected within a period of a plurality of frames consecutively;

selecting said antenna to be measured as the antenna in actual use when the calculated reception level of said antenna in actual use is smaller than a mean value of the reception level of said antenna to be measured; and selecting the next antenna to be measured according to said selection priority.

10. The antenna selection diversity reception method according to claim 9, wherein a mean value of the reception level of said antenna to be measured is reflected in the corresponding antenna gains of the respective antenna gains of said prestored three or more antennas to update selection priority, said antenna to be measured is selected as an antenna in actual use when said calculated reception level of said antenna in actual use is lower than the priority of the updated antenna to be measured and the next antenna to be measured is selected according to said selection priority.

* * * * *